US010311307B2

(12) United States Patent
Gottschlich et al.

(10) Patent No.: US 10,311,307 B2
(45) Date of Patent: Jun. 4, 2019

(54) METHODS AND APPARATUS FOR VIDEO WALL WITH FEED INDICATORS

(71) Applicant: Raytheon Company, Waltham, MA (US)

(72) Inventors: Susan N. Gottschlich, Marlborough, MA (US); Brian Stone, Woodridge, VA (US); Raimund Merkert, Ayer, MA (US); William Lawrence Gerecke, III, Stow, MA (US)

(73) Assignee: RAYTHEON COMPANY, Waltham, MA (US)

( * ) Notice: Subject to any disclaimer, the term of this patent is extended or adjusted under 35 U.S.C. 154(b) by 124 days.

(21) Appl. No.: 14/746,888

(22) Filed: Jun. 23, 2015

(65) Prior Publication Data
US 2016/0379059 A1    Dec. 29, 2016

(51) Int. Cl.
| *G06K 9/00* | (2006.01) |
| *G08B 13/196* | (2006.01) |
| *H04N 5/232* | (2006.01) |
| *H04N 5/262* | (2006.01) |
| *H04N 5/247* | (2006.01) |
| *H04N 7/18* | (2006.01) |

(52) U.S. Cl.
CPC ... *G06K 9/00771* (2013.01); *G08B 13/19693* (2013.01); *H04N 5/232* (2013.01); *H04N 5/23229* (2013.01); *H04N 5/23293* (2013.01); *H04N 5/247* (2013.01); *H04N 5/2624* (2013.01); *H04N 7/185* (2013.01)

(58) Field of Classification Search
CPC .............. G06K 9/00771; H04N 5/247; H04N 5/23229; H04N 5/23293; H04N 5/232; H04N 5/2624; H04N 7/181; G08B 13/19693
See application file for complete search history.

(56) References Cited

U.S. PATENT DOCUMENTS

| 4,884,220 A * | 11/1989 | Dawson ................ G06F 9/345 345/573 |
| 7,802,204 B2 * | 9/2010 | Merry .................... G06Q 10/10 715/764 |
| 8,401,869 B2 | 3/2013 | Renzi et al. |

(Continued)

FOREIGN PATENT DOCUMENTS

| WO | WO 2005/050582 A2 | 6/2005 |
| WO | WO 2007 073420 A1 | 6/2007 |

(Continued)

OTHER PUBLICATIONS

PCT International Search Report and Written Opinion dated Jun. 10, 2016 corresponding to International Application No. PCT/US2016/026098; 12 Pages.

(Continued)

*Primary Examiner* — Joseph Suh
(74) *Attorney, Agent, or Firm* — Daly, Crowley, Mofford & Durkee, LLP

(57) ABSTRACT

Methods and apparatus for processing video feed metadata for respective video feeds and controlling an indicator for at least one the video feeds on a video wall. The video stream indicator can allow a viewer of the video wall to reduce the likelihood of missing an event of interest in the video feeds.

20 Claims, 5 Drawing Sheets

(56) References Cited

U.S. PATENT DOCUMENTS

| | | | | |
|---|---|---|---|---|
| 2002/0186252 | A1* | 12/2002 | Himmel | G06F 3/04855 |
| | | | | 715/787 |
| 2004/0105573 | A1* | 6/2004 | Neumann | G06T 17/00 |
| | | | | 382/103 |
| 2005/0020316 | A1* | 1/2005 | Mahini | G06F 3/0482 |
| | | | | 455/566 |
| 2010/0277588 | A1* | 11/2010 | Ellsworth | G06F 17/3087 |
| | | | | 348/144 |
| 2011/0105224 | A1* | 5/2011 | Hartmann | G07F 17/32 |
| | | | | 463/30 |
| 2011/0187895 | A1* | 8/2011 | Cheng | H04N 5/228 |
| | | | | 348/231.2 |
| 2013/0144652 | A1* | 6/2013 | Roberson | G06F 19/3431 |
| | | | | 705/3 |
| 2013/0178335 | A1* | 7/2013 | Lin | A63B 71/06 |
| | | | | 482/8 |
| 2013/0201273 | A1 | 8/2013 | Renzi et al. | |
| 2014/0270131 | A1* | 9/2014 | Hand | H04M 3/42 |
| | | | | 379/208.01 |
| 2015/0036533 | A1* | 2/2015 | Sodhi | H04L 43/0894 |
| | | | | 370/253 |
| 2015/0215766 | A1* | 7/2015 | Russell | H04W 8/18 |
| | | | | 455/433 |
| 2015/0264296 | A1* | 9/2015 | Devaux | H04N 5/77 |
| | | | | 386/226 |
| 2015/0312520 | A1* | 10/2015 | Nohria | G09B 5/06 |
| | | | | 434/350 |
| 2016/0066003 | A1* | 3/2016 | Foote | H04N 21/4661 |
| | | | | 725/35 |
| 2016/0306071 | A1* | 10/2016 | Iranpour | G01S 17/023 |

FOREIGN PATENT DOCUMENTS

| | | |
|---|---|---|
| WO | WO 2009/121053 A2 | 10/2009 |
| WO | WO 2012 054191 A1 | 4/2012 |

OTHER PUBLICATIONS

PCT International Preliminary Report dated Jan. 4, 2018 for International Application No. PCT/US2016/026098; 9 Pages.

Response to EPO communication dated Jan. 30, 2018 for EP Application No. 16721281.0 as filed on Aug. 2, 2018; 14 Pages.

* cited by examiner

METHODS AND APPARATUS FOR VIDEO WALL WITH FEED INDICATORS

GOVERNMENT LICENSE RIGHTS

This invention was made with Government support. The Government has certain rights in the invention.

BACKGROUND

As is known in the art, security, public safety, military personnel, and others, may simultaneously view a number of live video feeds, such as from Unmanned Arial Vehicles (UAVs), drones, fixed surveillance cameras, and other surveillance systems in operation centers. Such multi-feed displays are referred to as video walls. However, when viewing a video wall having a number of video feeds, it can be challenging to determine which of the video feeds is of interest. For example, an operator of a UAV may have zoomed in on a target of interest. However, the viewers of the video for that UAV may not be in contact with the operator and have no idea that a significant event may be in progress on one of the feeds on the wall. A viewer of the video wall may miss events of interest on a video feed.

SUMMARY

The present invention provides method and apparatus for processing metadata or sensor data for multiple video feeds to identify platform or sensor events that are of particular interest. In embodiments, the metadata is processed to trigger recognition or emphasis of significant events associated with one or more of the video feeds. For example, the recognition of a significant event can result in automated highlighting of a particular feed on the video wall to facilitate viewers of the wall perceiving the event of interest.

In embodiments, an operations center includes a video wall having a number of video feeds, such as unmanned aerial vehicle feeds, manned surveillance aircraft feeds, aerostat surveillance feeds, fixed (e.g. pole mounted sensor) feeds, open source cable news broadcasts, and the like, to provide situational awareness. Personnel in the operations center may be working on personal computers performing various tasks while having a field of view that includes the video wall.

Conventional video walls do not include any indication of priority for the various video feeds so that personnel in the vicinity, or attentive to, the video wall, may not notice significant events captured in one or more of the video feeds. For example, surveillance video typically includes long monotonous periods of insignificant activity punctured by brief occurrences of significant events. Viewers may want to 'keep an eye' on the wall but may not be able to completely focus on the video wall feeds.

Embodiments of the invention utilize video feed metadata to provide some level of priority or activity indication to one or more video feeds. Illustrative metadata includes platform position, altitude, heading, and velocity together with sensor frustum (field of view of the sensor), etc. The metadata is streamed together with video frames from the sensors. Since the platforms and the onboard sensors may be controlled by one or more humans or automated systems, a significant change in metadata may correspond to a significant event being captured, or expected to be captured, in the video feed. For example, the sensor direction may be changed and/or the sensor is zoomed in or out (denoting a change to its frustum) or the platform heading or velocity may be changed. The metadata can be processed to recognize such changes and provide an indicator that can be perceived by viewers of the video wall.

For example, zoom in, zoom out, frustum centroid change, platform heading change, platform velocity change can be recognized A relatively minor zooming in of a video sensor suggests an operator wants to take a closer look but there is possibly nothing of interest happening. On the other hand, if the sensor is zoomed in substantially and the platform begins to hover over an area of terrain, this suggests a highly significant event may be occurring. Alternatively, if the sensor is zoomed out and the platform begins to move after hovering, this suggests that the significant event has ended.

A variety of suitable indications can be used to direct user attention to a particular one of the video feeds. Illustrative indications include coloring a border around a video feed, increasing the size of one video feed relative to other video feeds, flashing the video feed for a few seconds, flashing a text overlay on the video feed, and the like. Some changes, such as a zoom out event, may be associated with the end of notification as they may signify a return to normal.

Embodiments can also include a priority level indicator. For example, a red indicator may signify highest priority, a yellow indicator may signify possible event upcoming, and the like.

In general, video indicators are controlled by processing video metadata without reference to the video stream images. The video indicators increase the ability of users of a video wall to more efficiently obtain information from the video wall and decrease the number of missed events of interest.

In embodiments, a video wall displays a number of full motion video (FMV) feeds from various sources. When an event occurs, it is likely that the video sensor is refocused and/or panned/tilted for a better view either manually or by someone in a remote location or automatically by a smart sensor. Scene analytic 'tags' can be generated based on video sensor metadata available, for example, in Standardization Agreement (STANAG) digital motion imagery standards (e.g. 4609 FMV feed).

In one aspect of the invention, a method comprises: receiving video feed metadata for respective video feeds, the metadata including sensor control parameters; and processing the metadata and controlling an indicator for at least one the video feeds on a video wall.

The method can further include one or more of the following features: the sensor control parameters include platform position, platform heading, sensor frustum, and zoom setting, a first one of the video feeds includes video from a drone, the drone video settings are controlled by a remote operator, the drone video settings include zoom setting, a heading of the drone is controlled by a remote operator, the indicator includes color, the indicator includes priority information, and/or the priority information is relative to others of the video feeds.

In a further aspect of the invention, an article comprises: a non-transitory computer-readable medium having stored instructions that enable a machine to: receive video feed metadata for respective video feeds, the metadata including sensor control parameters; and process the metadata and controlling an indicator for at least one the video feeds on a video wall.

The article can further include instructions for one or more of the following features: the sensor control parameters include platform position, platform heading, sensor frustum, and zoom setting, a first one of the video feeds includes video from a drone, the drone video settings are controlled by a remote operator, the drone video settings include zoom setting, a heading of the drone is controlled by a remote operator, the indicator includes color, the indicator includes priority information, and/or the priority information is relative to others of the video feeds.

In a further aspect of the invention, a video wall system, comprises: a module configured to receive video feed metadata for respective video feeds, the metadata including sensor control parameters; and a signal processor configured to process the metadata and control an indicator for at least one the video feeds on a video wall.

The system can further include one or more of the following features: the sensor control parameters include platform position, platform heading, sensor frustum, and zoom setting, a first one of the video feeds includes video from a drone, the drone video settings are controlled by a remote operator, the drone video settings include zoom setting, a heading of the drone is controlled by a remote operator, the indicator includes color, the indicator includes priority information, and/or the priority information is relative to others of the video feeds.

BRIEF DESCRIPTION OF THE DRAWINGS

The foregoing features of this invention, as well as the invention itself, may be more fully understood from the following description of the drawings in which.

DETAILED DESCRIPTION

Figure 1:
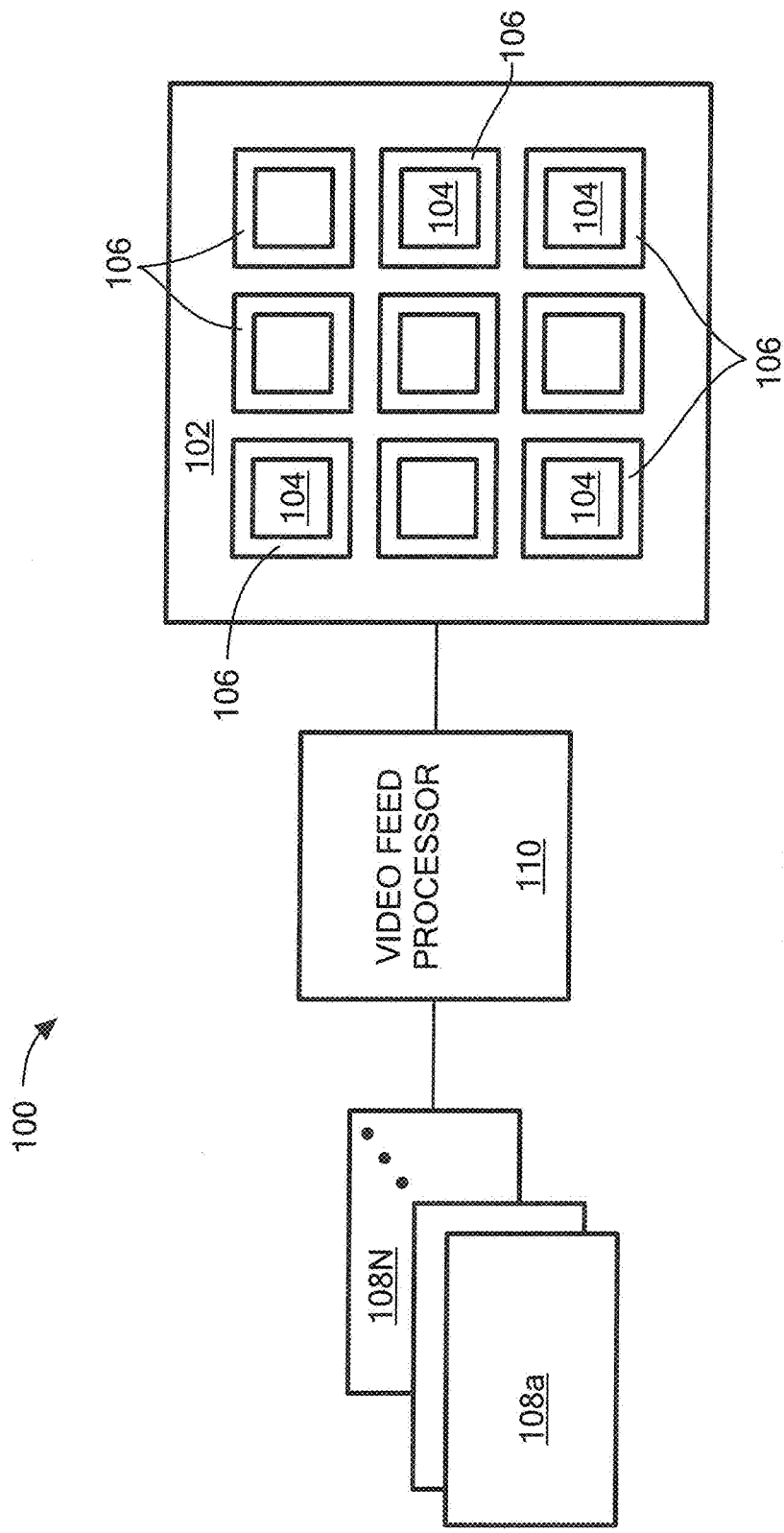
FIG. 1 is a schematic representation of a system for controlling a video wall and providing feed indicators.

FIG. 1 shows an illustrative system 100 including a video wall 102 having a number of video screens 104 having respective indicators 106. A number of video feeds 108a-N, which can comprise remote video sensors, are provided to a video feed processor 110. The video feed processor 110 processes the video feed and associated metadata to control the indicators 106 on the video wall 102.

The metadata can comprise various parameters, such as platform position and zoom length, that can be analyzed to selectively activate an indicator 104 for a screen on which a video feed is being shown. The indicator 104 can be activated to call attention to a particular feed that may be of interest to viewers of the wall 103 based on the metadata. For example, a drone being controlled by a remote operator may have a heading change and an aggressive zoom that may be indicative of some upcoming event of interest. By processing the metadata, the indicator 106 for that feed 104 can be activated to reduce the likelihood that viewers of the wall 102 will miss an event of interest.

It is understood that each feed 104 may have a respective indicator 106. In other embodiments, an indicator system provides an indicator directed to and activated for each of the feeds. For example, the indicator system may emit a low power laser light to corner of a given feed 104 to indicate a particular priority of that feed. Red may indicate highest priority and green may indicate lowest priority or no expected significant events upcoming.

In another embodiment, the system 100 prioritizes the video feeds 104 by processing the metadata and showing the video feeds such that the highest priority feed is in a first priority position, such as top left, a second highest priority feed is in a second priority position, such as top, to right of the highest priority feed, and the like.

Figure 2:
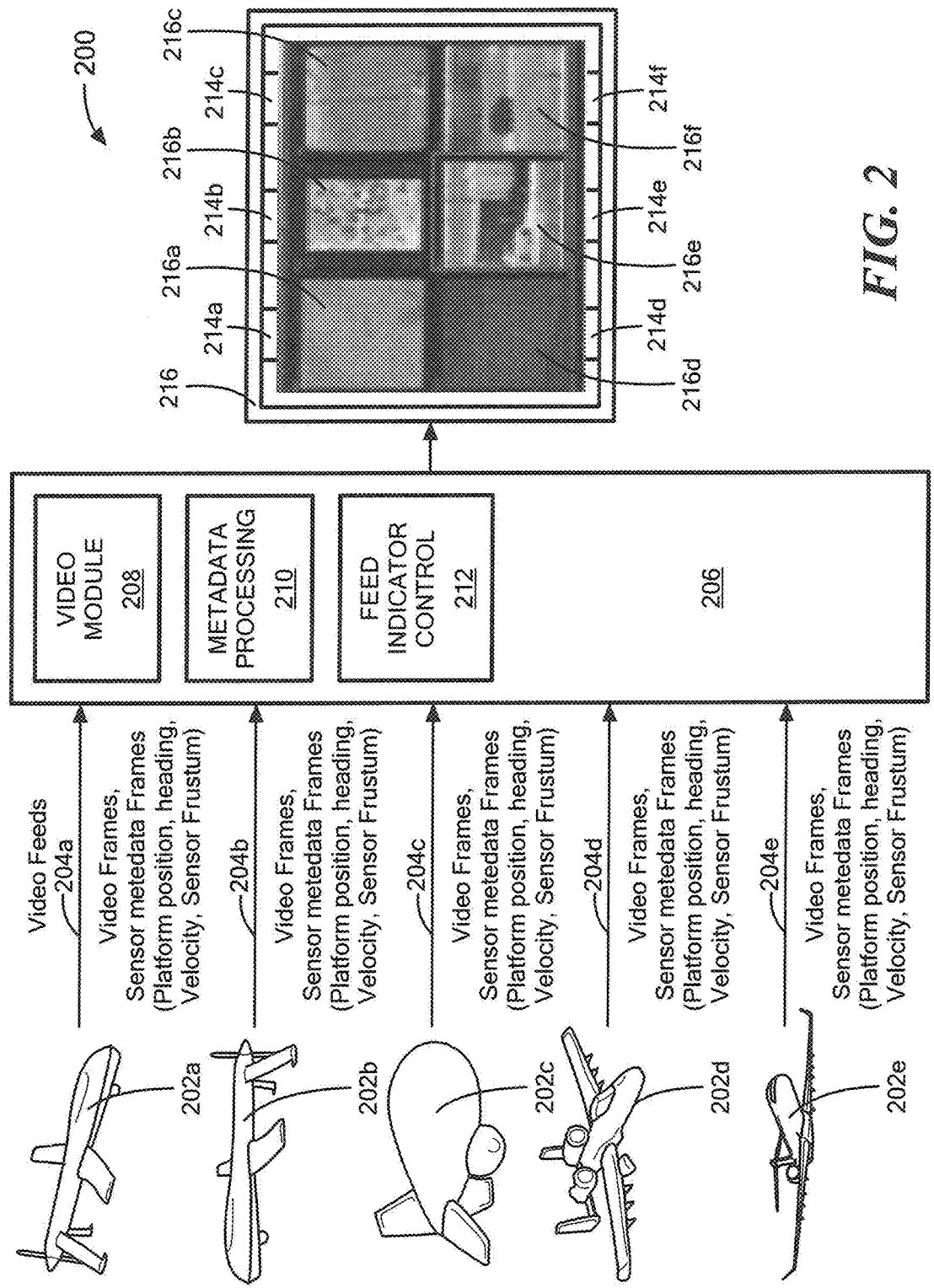
FIG. 2 is a schematic representation showing further details of the system of FIG. 1.

FIG. 2 shows a system 200 receiving a number of illustrative real time surveillance video feeds 202a-e, including a first drone 202a, a second drone 202b, a first aerostat 202c, a first aircraft 202d, and second aircraft 202e. It is understood that a drone refers to a type of UAV, such as a remotely controlled surveillance aircraft. Each of the video feeds 204a-e includes sensor metadata, such as platform position, heading, velocity, and sensor frustum. It is understood that sensor frustum refers to a field of view that appears on a screen, which can be defined by taking a frustum (truncation with parallel planes) for a camera with rectangular viewports, e.g., a frustum of a rectangular pyramid. The planes that cut the frustum perpendicular to the viewing direction are called the near plane and the far plane.

A feed processing module 206 receives the video feeds and metadata 204. A video feed module 208 receives the video stream, a metadata processing module 210 receives the metadata, and a feed indicator control module 212, which is coupled to the metadata processing module 210, controls the indicators 214a-f on a video wall 216 for each of the screens 216a-f.

While illustrative metadata having certain parameters is shown, it is understood that a wide range of parameters can be provided. In addition, while embodiments are shown in conjunction with video feeds, it is understood that any type of data stream can be processed, such as audio only data, which can be provided to a video wall screen with optional text-to-speech (TTS), for example.

In the illustrated embodiment, the video feed in the bottom middle position 216e on the video wall 216 has an active indicator 214e to enhance the ability of viewers of the video wall to focus on the tagged frames of that video stream.

Figure 3:
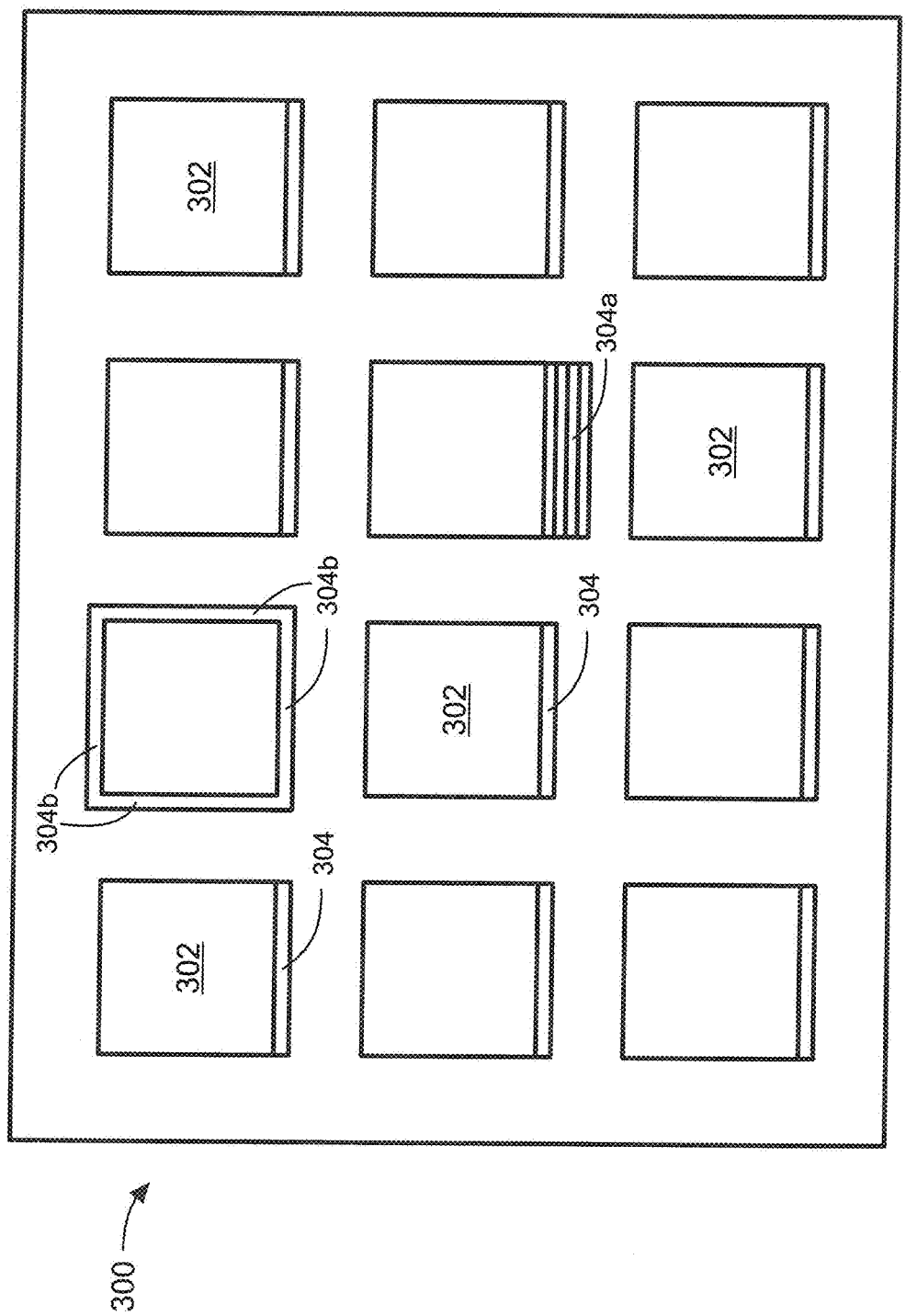
FIG. 3 is a schematic representation showing further details of a video wall and feed indicators for the system of FIG. 1.

FIG. 3 shows an illustrative video wall 300 having screens 302 for showing respective video feeds with indicators 304 for each screen. It is understood that the indicators 304 can be provided in a variety of formats, configurations, and technologies that are suitable to bring viewer attention to a given screen. In embodiments, the indicators 304 illuminate in a particular color. The colors can indicate a discrete attention level by increasing wavelength, e.g., (violet, blue, green, yellow, orange, red). As is known in the art, blue (470 nm) has a shorter wavelength than red (700 nm), for example. In other embodiments, each indicator 304a can comprises a number of bars so that the number of bars illuminated corresponds to an attention level. In further embodiments, the bars 304b are located around each edge of the screen. A lower priority can be one bar under the screen illuminated, and a higher priority is a bar along each screen edge being illuminated. In embodiments, a sound, such as a chirp, can be generated for events above a given priority level. This can enable personnel not presently focused on the video wall to bring their attention on the video wall including a particular feed in response to the chirp.

In embodiments, video feed metadata is processed independently such that an indicator 304 for a given feed is controlled using the metadata for that field. Based on the metadata, the feed indicator is controlled to be off, green, red, flashing, etc.

In other embodiments, video feed metadata is processed for the video feeds such that the indicator for one feed is controlled using metadata from at least one other feed. In embodiments, the independent/combined metadata processing is selected manually or on some criteria. For example, during times of intense activity for multiple feeds, the metadata may be processed as a whole to control the various feed indicators in such a way to provide some feed priority for viewers of the video wall. In one embodiment, a video feed from a drone maneuvering in a manner consistent with known attack protocols can result in the indicator for that feed being controlled to indicate highest priority for all the feeds active on the video wall. In another embodiment, a video feed from a drone within a given range of a particular geographic location can result in the indicator for that feed being controlled to indicate highest priority for all the feeds active on the video wall. A variety of high priority items, such as events, actions, locations, etc., can be ranked in priority. If multiple ones of the high priority items occur simultaneously, the ranking can be translated to the indicators for the respective video feed.

In one embodiment, scenes in one or more video streams can be tagged. Illustrative scene tags are set forth below:
1. Zoom in—computed from sensor frustum
2. Zoom out—computed from sensor frustum
3. Field of view change—computed from sensor frustum
4. Heading change—computed from heading
5. Begin stare—computed from sensor frustum
6. End stare—computed from sensor frustum
7. Trajectory change—computed from vehicle velocity & heading Illustrative indicator controls are set forth below for example operation actions with respect to various parameters.

| Scene Tag | Operator Action | Indicator Scheme |
|---|---|---|
| Zoom In | 1 minute Zoom highlight | Orange border around video |
| Zoom Out | No highlight | |
| Begin Stare | Stare highlight | Red border around video |
| End Stare | No highlight | |
| Field of view change | 10 second view highlight | Yellow border around video |
| Trajectory change, heading change | 10 second trajectory highlight | Green border around video |

It is understood that in surveillance missions, the term 'stare' is typically used to refer to controlling a sensor platform and/or sensor in such a way as to maintain an approximately constant field of view so as to capture the activity in the field of view over the period of time in which the stare is being executed.

Figure 4:
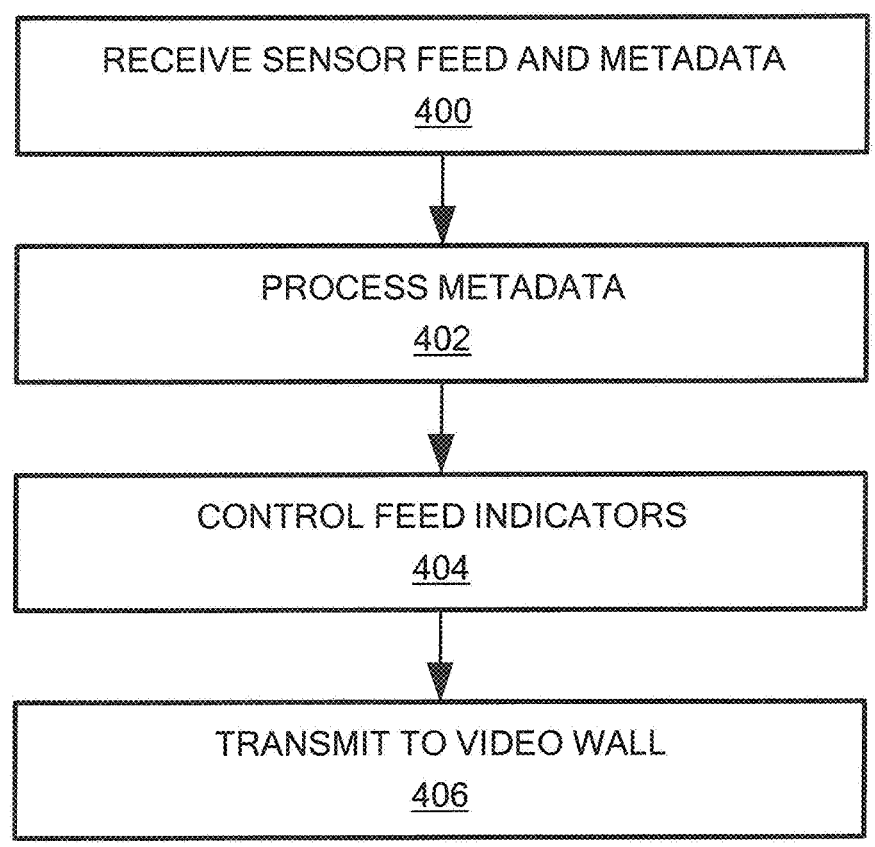
FIG. 4 is a flow diagram showing illustrative processing of sensor metadata and feed indictors.

FIG. 4 shows an illustrative sequence of steps for video feed indicator control. In step 400, sensor feed and metadata is received. In step 402, the video feed metadata is processed to analyze operator control actions for the sensor, for example. Based on the metadata, in step 404, indicators for the various feeds are controlled to provide some level of priority to the video feeds on the video wall. In step 406, the video feeds and screen indicator information is transmitted to the video wall. With this arrangement, a viewer of the video wall may be provided an indication that an event of interest is occurring, or may be occurring.

In embodiments, metadata processing and control of indicators is performed in a 'pipeline' in order to minimize latency between metadata artifact and indicator reaction. In one particular embodiment, a first step in the pipeline strips metadata from the video. A single metadata record is typically inserted into line 21, for example, of 3-4 consecutive video frames. A next step normalizes the metadata and populates an internal data structure by performing appropriate processing, e.g., determining the sensor frustum. A next step compares the newly created metadata data structure to the sequence of preceding metadata structures to compute factors, such as delta zoom, length of stare, percent of trajectory change, etc. A further step determines which, if any, indicator(s) should be generated. In general, this processing is performed on a sensor by sensor basis. Further processing can be performed to determine any relationships between sensors.

Figure 5:
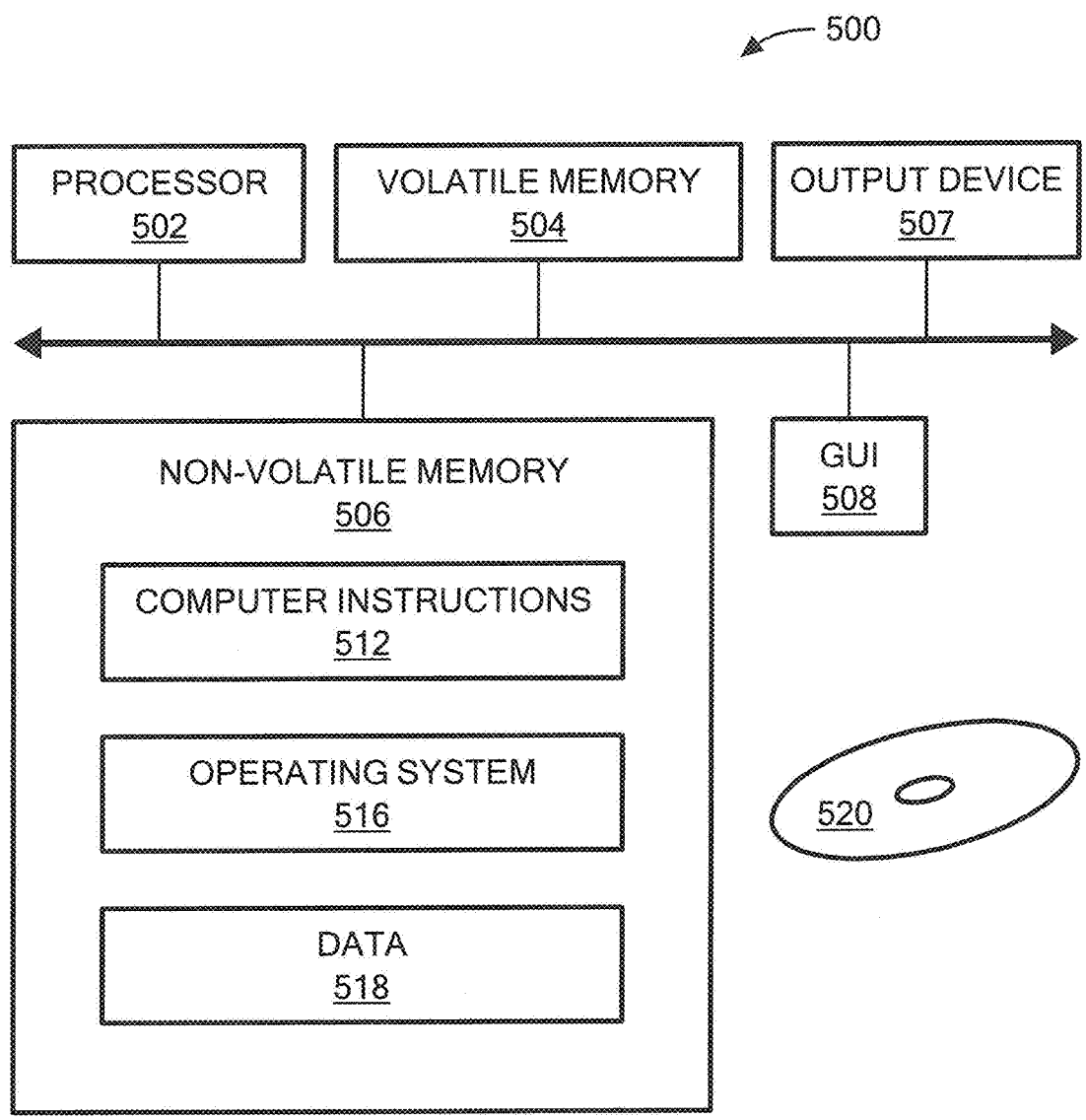
FIG. 5 is a schematic representation of an illustrative computer that can perform at least a portion of the processing described herein.

FIG. 5 shows an exemplary computer 500 that can perform at least part of the processing described herein. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
   receiving video feeds and video feed metadata for the video feeds, the metadata including sensor control parameters of remote sensors that are used to capture the video feeds;
   processing the metadata using a processor of a video wall system to detect a change in a respective sensor control parameter of a remote sensor providing a given one of the video feeds; and
   displaying the video feeds and an indicator for the given one of the video feeds on a video wall of the video wall system based on the processed metadata, the indicator being generated based on the detected change in the respective sensor control parameter of the remote sensor providing the given one of the video feeds, the indicator being displayed on the video wall concurrently with at least the given one of the video feeds.

2. The method according to claim 1, wherein the respective sensor control parameter includes at least one of a platform position, a platform heading, and a zoom setting.

3. The method according to claim 1, wherein a first one of the video feeds includes video from a drone that is captured in accordance with drone one or more drone video settings.

4. The method according to claim 3, wherein the drone video settings are controlled by a remote operator.

5. The method according to claim 4, wherein the drone video settings include zoom setting.

6. The method according to claim 3, wherein a heading of the drone is controlled by a remote operator.

7. The method according to claim 1, wherein the indicator includes color.

8. The method according to claim 1, wherein the indicator includes priority information.

9. The method according to claim 8, wherein the priority information is relative to others of the video feeds.

10. The method according to claim 8, wherein the priority information includes a priority of at least one event of interest, and the video feeds are shown in respective priority positions on the video wall according to the priority of the at least one event of interest.

11. The method according to claim 1, wherein the indicator illuminates in a predetermined color, the predetermined color indicating a discrete attention level by increasing wavelength.

12. An article, comprising:
    a non-transitory computer-readable medium having instructions stored thereon such that in response to the instructions executed by a processor, the processor performs steps which enable the processor to:
    receive video feeds and video feed metadata for the video feeds, the metadata including sensor control parameters of remote sensors that are used to capture the video feeds;
    process the metadata to detect a change in a respective sensor control parameter of a remote sensor providing a given one of the video feeds; and
    display the video feeds and an indicator for the given one of the video feeds on a video wall of a video wall system based on the processed metadata, the indicator being generated based on the detected change in the respective sensor control parameter of the remote sensor providing the given one of the video feeds, the indicator being displayed concurrently with at least the given one of the video feeds.

13. The article according to claim 12, wherein the respective sensor control parameter includes at least one of a platform position, a platform heading, a sensor frustum, and a zoom setting.

14. The article according to claim 12, wherein a first one of the video feeds includes video from a drone that is captured in accordance with drone one or more drone video settings.

15. The article according to claim 14, wherein the drone video settings are controlled by a remote operator.

16. The article according to claim 15, wherein the drone video settings include zoom setting.

17. The article according to claim 14, wherein a heading of the drone is controlled by a remote operator.

18. The article according to claim 12, wherein the indicator includes priority information.

19. The article according to claim 8, wherein the priority information is relative to others of the video feeds.

20. A video wall system, comprising:
    a processor and a memory configured to:
    receive video feeds and video feed metadata for the video feeds, the metadata including sensor control parameters of remote sensors that are used to capture the video feeds; and
    process the metadata to detect a change in a respective sensor control parameter of a remote sensor providing a given one of the video feeds; and
    display the video feeds and an indicator for the given one of the video feeds on a video wall of the video wall system based on the processed metadata, the indicator being generated based on the detected change in the respective sensor control parameter of the remote sensor providing the given one of the video feeds, the indicator being displayed concurrently with at least the given one of the video feeds.

* * * * *